US009104471B2

(12) United States Patent
Burghard et al.

(10) Patent No.: US 9,104,471 B2
(45) Date of Patent: Aug. 11, 2015

(54) TRANSACTION LOG MANAGEMENT

(75) Inventors: Stephen John Burghard, Fareham (GB); Ian James Mitchell, Eastleigh (GB); Andrew Wright, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 583 days.

(21) Appl. No.: 12/236,678

(22) Filed: Sep. 24, 2008

(65) Prior Publication Data

US 2009/0240742 A1 Sep. 24, 2009

(30) Foreign Application Priority Data

Oct. 15, 2007 (EP) ..................................... 07118447

(51) Int. Cl.
*G06F 17/30* (2006.01)
*G06F 9/46* (2006.01)
*G06F 11/14* (2006.01)
*G06F 11/34* (2006.01)

(52) U.S. Cl.
CPC ............ *G06F 9/466* (2013.01); *G06F 11/1471* (2013.01); *G06F 11/34* (2013.01)

(58) Field of Classification Search
CPC ...................................................... G06F 9/466
USPC .......................................... 707/999.202, 758
See application file for complete search history.

(56) References Cited

U.S. PATENT DOCUMENTS 5,956,489 A * 9/1999 San Andres et al. .......... 709/221
6,754,842 B2 6/2004 Kettley et al.
6,889,214 B1 * 5/2005 Pagel et al. .................... 705/410

2002/0198984 A1 * 12/2002 Goldstein et al. ............. 709/224
2003/0115429 A1 * 6/2003 Olstad et al. .................. 711/158
2009/0100113 A1 * 4/2009 Burghard et al. ............. 707/202

FOREIGN PATENT DOCUMENTS

JP          0764875 A2      3/1995
JP       2006155438 A2      6/2006

* cited by examiner

*Primary Examiner* — Jensen Hu
(74) *Attorney, Agent, or Firm* — Cuenot, Forsythe & Kim, LLC

(57) ABSTRACT

A transaction processing system comprising a transaction log, a log management policy, a profile and a log manager, and method for managing the transaction log are provided. The method comprises maintaining a transaction log of recoverable changes made by transaction processing tasks, each task having an associated transaction type; storing a log management policy including at least one log threshold and a plurality of possible actions associated therewith; and storing a profile of log resource usage characteristics of tasks for different types of transactions. Usage of the log by transaction processing tasks is monitored to determine when a log threshold is reached. The profile indicates the normal logging behavior of particular types of transaction by identifying ranges of acceptable values for a plurality of log resource usage characteristics. Such characteristics may include time taken for a task to complete, CPU resource consumed, number of log records made, etc. From a comparison of the profile behavior with the current log resource usage of a task which has been identified as holding up trimming of the log, likelihood that the identified task having entered an invalid loop and represents a 'bad' program, rather than simply validly taking a long time to complete can be inferred. Thus the most appropriate action can be selected and taken.

18 Claims, 5 Drawing Sheets

TRANSACTION LOG MANAGEMENT

FIELD OF THE INVENTION

The present invention relates to the field of data processing and in particular to a system and method for managing a transaction log.

BACKGROUND OF THE INVENTION

Transactions are familiar to us in everyday life when we exchange money for goods and services, such as buying a train ticket or paying for medicine. Such transactions involve a short conversation (for example, requesting availability and cost), and then making the payment. The processing of any one of these items is a business transaction of the kind that is handled by a transaction management system.

A transaction in the business sense can be viewed as an activity that must be completed in its entirety with a mutually agreed-upon outcome. It usually involves operations on some shared resources and results in overall change of state affecting some or all of those resources. When an activity or a transaction has been started and the mutually agreed outcome cannot be achieved, all parties involved in a transaction should revert to the state they were in before its initiation. In other words, all operations should be undone as if they had never taken place.

There are many examples of business transactions. A common one involves transfer of money between bank accounts. In this scenario, a business transaction would be a two-step process involving subtraction (debit) from one account and addition (credit) to another account. Both operations are part of the same transaction and both must succeed in order to complete the transaction. If one of these operations fails, the account balances must be restored to their original states.

Typically such transactions consist of many computing and data access tasks to be executed in one or more machines; the tasks may include handling the user interface, data retrieval and modification, and communications. In the example above, the money transfer operation is a transaction composed of debiting one account and crediting another.

In the context of business software, we can express the above more precisely. A transaction (sometimes also referred to as a 'Unit-Of-Work' or 'UOW') is a set of related operations that must be completed together. All their recoverable actions must either complete successfully or not at all. This property of a transaction is referred to as 'atomicity'.

In the simplest case, a transaction will access resources connected to a single computer processor. Such a transaction is referred to as a 'local transaction'. More often, however, a transaction will access resources which are located in several different computer processors, or logical partitions, each maintaining its own transaction log. Such a transaction is referred to as a 'distributed transaction'.

When a distributed transaction ends, the atomicity property of transactions requires that either all of the processors involved commit the transaction or all of them abort the transaction. To achieve this one of the processors takes on the role of coordinator to ensure the same outcome at all of the parties to the transaction, using a 'coordination protocol' that is commonly understood and followed by all the parties involved. The two-phase commit protocol has been widely adopted as the protocol of choice in the distributed transaction management environment. This protocol guarantees that the work is either successfully completed by all its participants or not performed at all, with any data modifications being either committed together (completed) or rolled back (backed out) together on failure.

Another property of a transaction is its durability. This means that once a user has been notified of success, a transaction's outcome must persist, and not be undone, even when there is a system failure. A recovery manager is used to ensure that a system's objects are durable and that the effects of transactions are atomic even when the system crashes. The recovery manager saves information required for recovery purposes. This recovery can be for the dynamic backout of a transaction, perhaps as a result of a failure after a task updated a recoverable temporary storage queue. Additionally the recovery data can be used for restoring a transaction processing system to a committed state, for example when the system is restarted after system failure. Typically, the recovery file comprises at least one log containing the history of the transactions performed by a transaction processing system. In the event of a system failure, the recovery file can be played back to return the system to its state right before the failure, and the transaction log(s) used to check for and undo transactions that were not properly completed before failure.

Also, in the event of a transaction failure, the transaction log can be used to reverse updates that have been carried out by that transaction, by working backwards from the last change before the failure, hence the name 'dynamic transaction backout'. The backout occurs before any locks on any affected resources are released, which safeguards other tasks from the possibility of using corrupted data, because modified data is not released for use by them ("committed") until the current task has finished with it. In case the log needs to be replayed later in a system restart, an entry is first made in the log to indicate that that transaction is being backed out.

Examples of systems which carry out such transaction logging include transaction systems such as IBM® CICS® Transaction Server or IBM WebSphere® Application Server, as well as database systems such as IBM DB2® or IBM IMS™ (IBM, CICS, WebSphere, DB2 and IMS are trade marks of International Business Machines Corporation).

The scheduling and dispatching of transaction processing tasks is usually handled by a task controller, which controls the order in which tasks are handled by allocating processor time among them, based on a dispatching priority value associated with each task. The log typically records the information in the order that the activity occurs. Without some management, this would consume an ever increasing amount of resource. So it must be reorganised on a regular basis so as to reduce its size by the recovery manager carrying out a process called 'keypointing'. Keypointing comprises writing current committed values of a system's objects to a new portion of the recovery file, together with transaction status entries and intentions lists for transactions that have not been fully resolved. An intentions list for a transaction contains a list of the references and the values of all the objects/resources that are altered by that transaction, as well as information related to the two-phase commit protocol. Once a keypoint has been taken, i.e. information stored through a keypointing procedure, recovery information for irrevocably committed (or backed out) transactions can usually be discarded from the log, sometimes called 'trimming' the log. This reduces the file size of the log as well as the number of transactions to be dealt with during recovery.

The rate that old log records are deleted by trimming should ideally match the rate at which new log data is being generated as new work enters the transaction system and makes its own recoverable changes to resources. In a well tuned on-line transaction processing (OLTP) environment, the volume of log data held on the log should remain reasonably constant over time, with an underlying periodic rise and fall in the number of log records held on the log as both the new work and the housekeeping work are performed.

This mechanism of log data deletion usually solves the problem of logs continually growing in size over time. However, a long-running UOW can prevent this mechanism from working, as until such a UOW has completed, and its log data is no longer required, its data cannot be deleted from the log and all data logged since the first log entry of that UOW must be maintained on the log. Hence, the system will not be able to trim the log after keypointing, and the log will grow and grow in size. A long-running unit of work (UOW) of this type may be a valid UOW that has performed a large number of recoverable changes, and so generated a large volume of log data. Alternatively, it may be for a so-called 'rogue' program that has entered an invalid loop while performing continual recoverable changes, thereby generating an excessive number of log records, or which is hanging in an uncommitted state.

Eventually, when a critical threshold of the logging subsystem, the operating system, or the available hardware is exceeded, a request to write to the log will fail for an "out of space" type of condition. When such an error is returned to the transaction system, it typically results in a serious failure. The system can no longer log any recoverable changes and so protect them from failures that require them to be backed out. Recovery processing (and hence data integrity) can no longer be guaranteed.

This present invention seeks to address the above problems and reduce the likelihood of encountering a log-full condition.

SUMMARY OF INVENTION

A first aspect of the invention provides a method for managing a transaction log in a transaction processing system. The method comprises maintaining a transaction log of recoverable changes made by transaction processing tasks, each task having an associated transaction type; storing a log management policy including at least one log threshold and a plurality of possible actions associated therewith; and storing a profile of log resource usage characteristics of tasks for different types of transactions. Usage of the log by transaction processing tasks is monitored to determine when a log threshold is reached. In response to determining that a log threshold has been reached, the active task having the oldest log entry of all active tasks is identified and the log resource usage of the identified task is compared to the log resource characteristics in the profile for the type of transaction with which the task is associated. In dependence on the results of the comparison, one of the plurality of possible actions associated with the threshold reached is selected and taken.

A second aspect of the invention provides a transaction processing system comprising a transaction log, a log management policy, a profile and a log manager. The transaction log records recoverable changes made by transaction processing tasks, each task having an associated transaction type. The log management policy identifies at least one log threshold and a plurality of possible actions associated therewith. The profile identifies log resource usage characteristics of tasks associated with certain types of transactions. The log manager monitors usage of the log by transaction processing tasks and determines when a log threshold is reached. In response to determining that a log threshold has been reached, the log manager is operable to identify an active task having the oldest log entry of all active tasks; compare the log resource usage of the identified task to the profiled log resource characteristics of the type of transaction with which the task is associated; select, in dependence on the comparison, one of the plurality of possible actions associated with the threshold reached; and request the selected action.

The profile indicates the normal logging behaviour of particular types of transaction by identifying ranges of acceptable values for a plurality of log resource usage characteristics. Such characteristics may include time taken for a task to complete, CPU resource consumed, number of log records made, etc. From a comparison of the profile behaviour with the current log resource usage of a task which has been identified as holding up trimming of the log, the likelihood that the identified task has entered an invalid loop and represents a 'bad' program, rather than simply validly taking a long time to complete, hi can be inferred. Thus the most appropriate action from a plurality of actions associated with a threshold can be selected and taken.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

Figure 1:
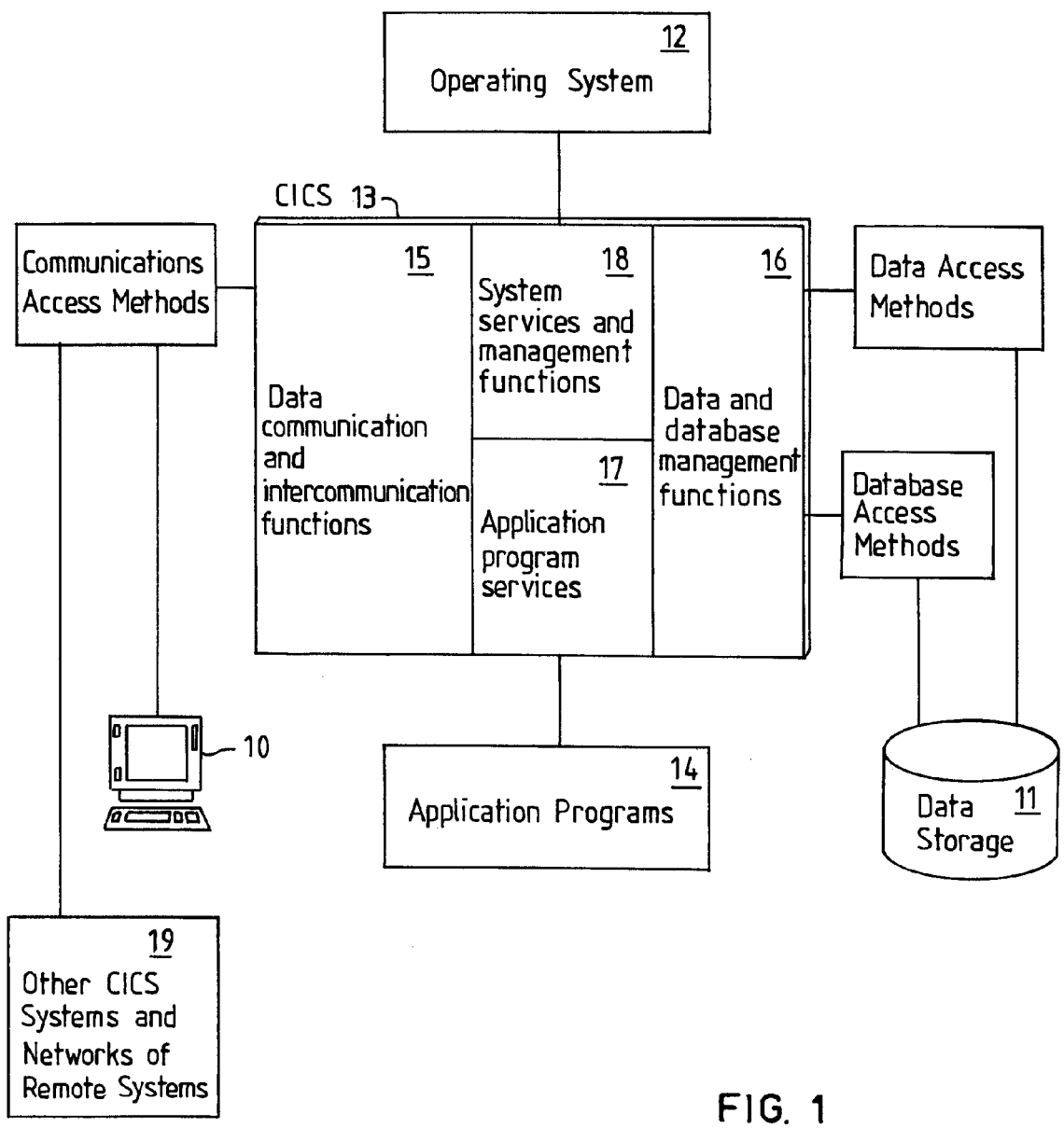
FIG. 1 shows an overview of a transaction processing system suitable for the implementation of a method according to the invention.

One preferred embodiment of the invention is implemented in relation to IBM's general purpose online transaction processing (OLTP) software, CICS®. FIG. 1 shows a CICS transaction processing system including associated hardware and software. The hardware includes terminals such as 20 and databases and files such as 11. A host computer operating system 12, such as MVS®, or z/OS®, supplies general data processing services to CICS software 13. The CICS software may be regarded as a subsidiary operating system, or application server, which provides specialized online services to provide an environment for execution of online application programs 14, typically written by a customer for a specific online transaction processing application. (MVS and z/OS are registered trade marks of International Business Machines Corporation).

Application programs give users online access to their data and the ability to send messages to other CICS users. In addition, application programs running under CICS can communicate with other programs running elsewhere in the same computer system, or with other computing systems 19.

The CICS software 13 includes data communication functions 15 which provide an interface between CICS and local or remote terminals to make the input or output of data easier. They provide a degree of device independence and format independence for application programs. There are also multi-region operation (MRO) and intersystem communication (ISC) facilities. CICS has interfaces to database products and to standard file access methods. CICS also has routines to handle queues and scratchpad data used within itself. Application program services 17 provide an interface between CICS and the application programs 14. System services 18 provide an interface between CICS and the operating system. They include functions to control CICS, and to share resources. Data handling functions 16 provide an interface between CICS and stored data 11. They allow the data to be read or updated, while preventing unauthorised access. Moreover, these functions ensure the preservation of data and system integrity, both in normal operation and under error conditions. In particular, these functions include recovery mechanisms and transaction logging.

In CICS, the scope of recoverable changes made by an application is known as a Unit of Work (UOW). This is the concept of a "transaction" in the general transaction processing sense, that is an inseparable set of recoverable changes which must all be performed, or else must all be backed out. This meaning of "transaction" is not the same as the one used within CICS; a CICS Transaction is an application comprising a predefined sequence of data processing that corresponds to a particular business transaction, such as the withdrawal of cash from an account via an ATM machine, for example. The sequence involves the execution of any number of CICS application programs that together carry out the application's role. These CICS application programs can contain one or more UOWs.

A CICS task is a particular instance of the performance of a CICS Transaction. Two ATM operators may start the same Transaction simultaneously, from different terminals (such as two different ATM machines, for example); each is setting the CICS system a separate task and will be given separate treatment. The execution of a CICS task can involve one or more UOWs.

Figure 2:
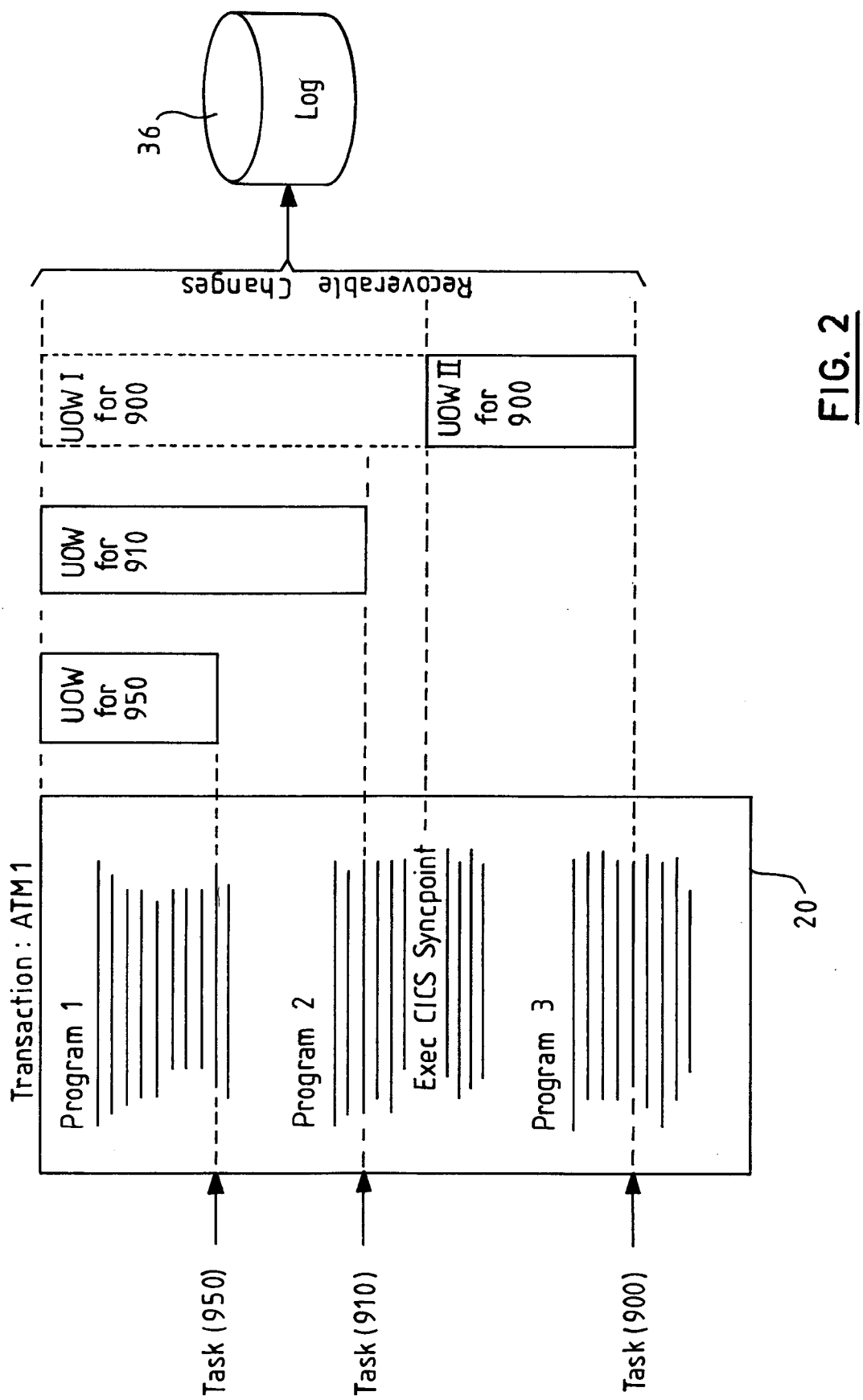
FIG. 2 illustrates the CICS concepts of transactions, tasks and UOWs.

FIG. 2 illustrates this concept. It shows a CICS Transaction 20 called 'ATM1', which comprises a sequence of three CICS application programs, Program 1, Program 2 and Program 3. Three tasks 950, 910 and 900 have each started for this Transaction and each is independently threading its way through the code for these three programs. As shown by the arrows on the left of the Transaction 20, each of these tasks is at a different stage of execution. To the right of the Transaction, the UOWs for each of these three tasks are shown. Task 900 has executed a first UOW I, which is no longer 'in-flight', (and thus shown in dashed line rather than solid line), having been committed by means of a syncpoint (here, an EXEC CICS SYNCPOINT command), which occurs in Program 2. It is currently executing a second UOW as part of the same Transaction. Recoverable changes for all the UOWs are stored in the log 36.

Figure 3:
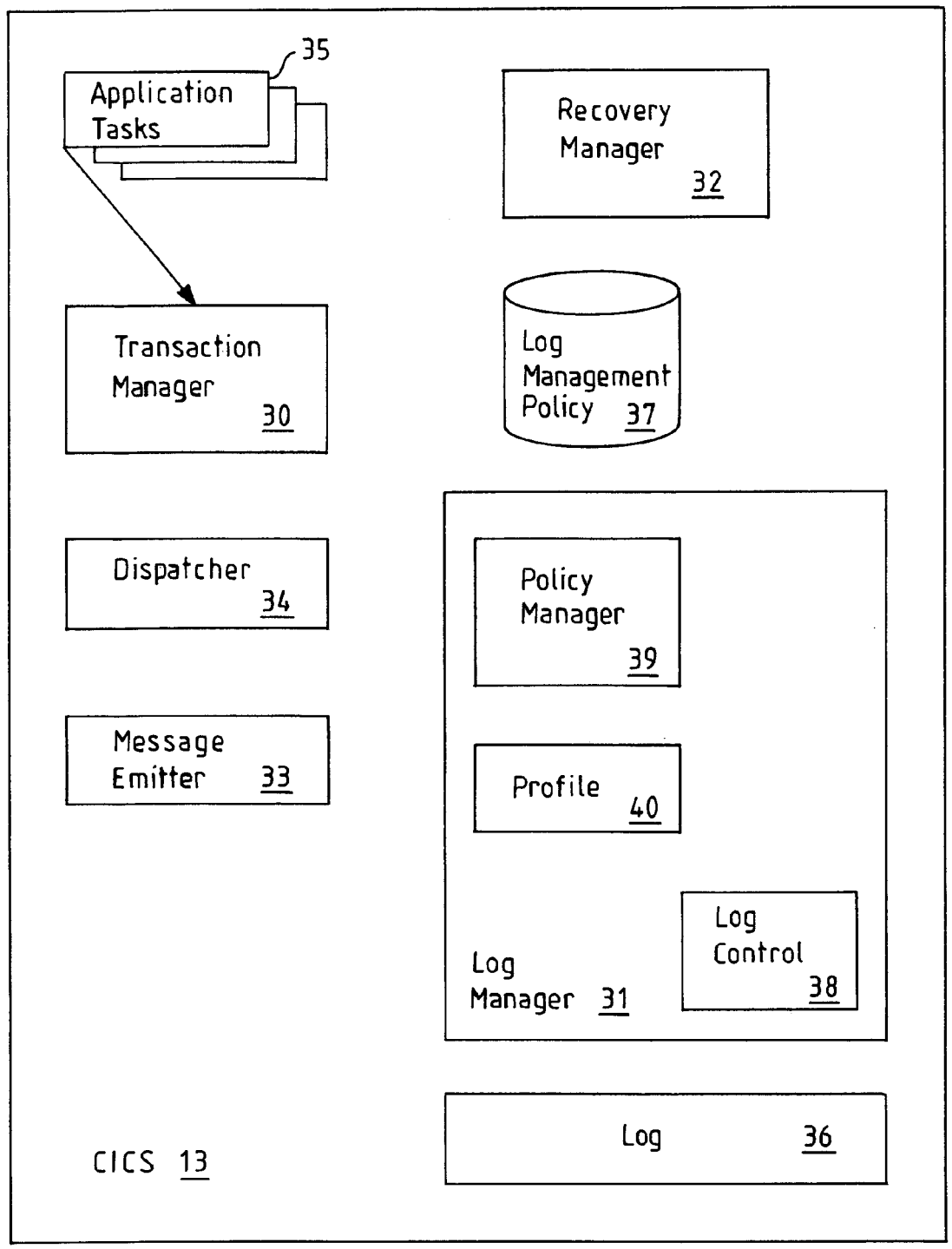
FIG. 3 shows the components for implementing the invention according to a preferred embodiment.

The system of the preferred embodiment will now be explained in further detail with reference to FIG. 3, which shows the main components involved. The system comprises transaction manager 30, log manager 31, recovery manager 32, message emitter 33, dispatcher 34, transaction processing tasks 35, log 36, log management policy 37, log control 38, policy manager 39, and profile.

The CICS Recovery Manager 32 coordinates UOW and CICS system recovery. The Recovery Manager invokes the Log Manager to store and retrieve log data for commit and backout purposes. The transaction log 36 used to support system recovery and dynamic transaction backout is called the CICS System Log. This is used to store log records required to provide dynamic transaction backout of a failing Unit-Of-Work (UOW); for example, when a task abends having written to a recoverable Virtual Storage Access Method (VSAM) file. In addition, the CICS System Log is used for recovering an entire CICS system to a committed state when performing an emergency restart.

Figure 5:
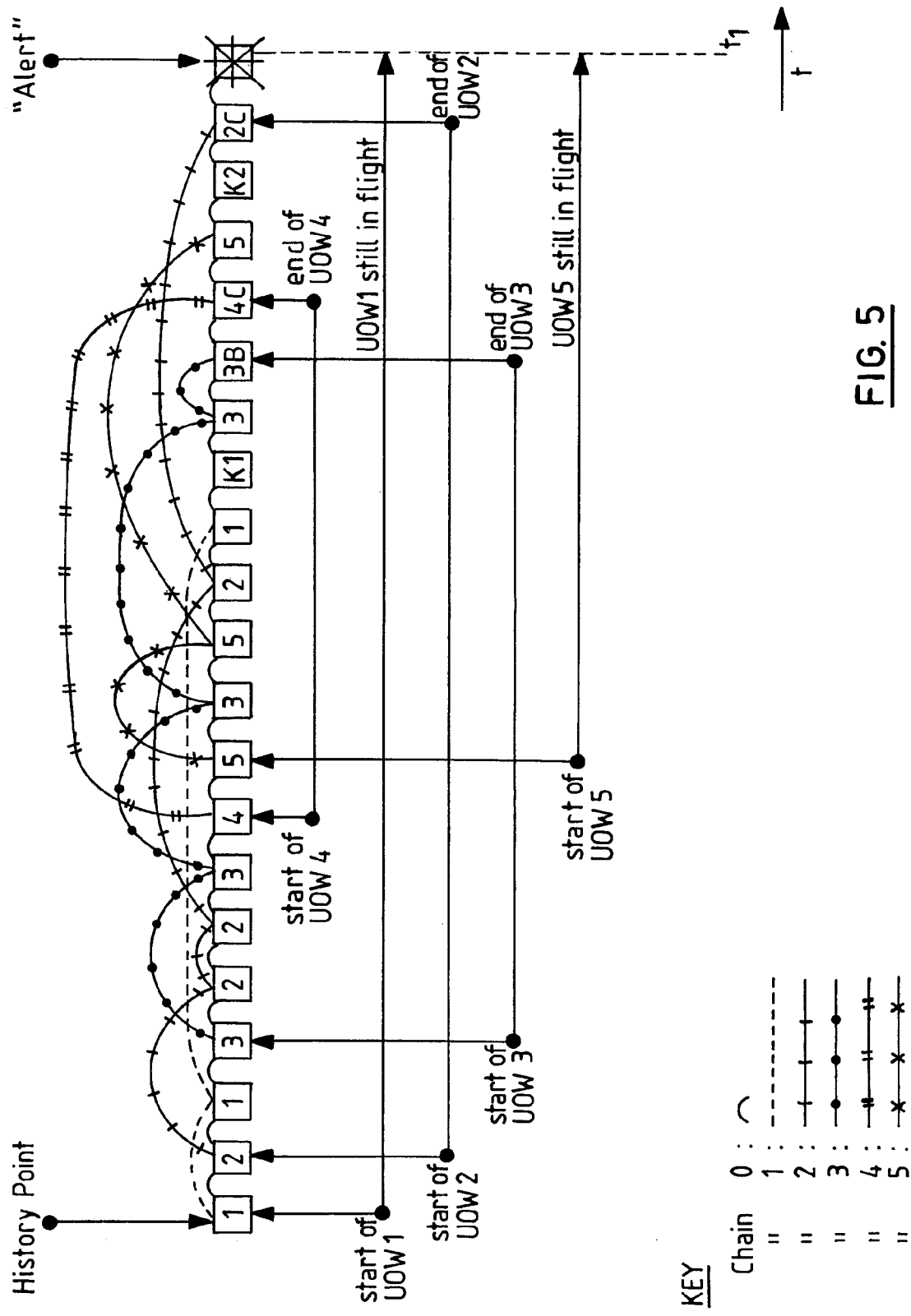
FIG. 5 shows a simple example log stream for explanation purposes.

The CICS System Log records "before-images" of changes to resources managed under CICS. Each log record is associated with a particular UOW and has an ID number called the 'blockid', which orders the log records in a sequential manner. Additionally, a log record may have a pointer to the blockid of the previous log record associated with the same UOW. Thus the log records are said to be linked together in 'chains' associated with particular UOWs, as well as in chronological order, as shown in FIG. 5. In this simplified example of a log stream, at time $t_1$ UOWs 1, 2, 3, 4, and 5 have each written to the log. Chain 0 represents a sequential chain from each log record back to the preceding record. Chains 1 to 5 link together log records associated with UOWs 1 to 5 respectively. UOWs 2, 3 and 4 have committed or backed out (as indicated by records 2C, 3B and 4C). Also shown on the log are two keypoint records K1 and K2. At the time of the first keypoint, K1, the log was trimmed up to the beginning of UOW 1 as shown in the Figure. At the time of the second keypoint, K2, no trimming of the log was able to take place as UOW1 was still inflight.

The log manager 31 comprises a log control 38 which monitors write requests to the log stream and maintains a count of bytes to the log and to each individual chain, as well as a profile 40 and a policy manager 39. The policy manager monitors the usage of the log by individual tasks and compares this usage to the system's log management policy 37.

Tasks within CICS can issue syncpoints to mark their work as consistent and ready to be committed. Part of syncpoint processing involves the logical deletion of the log data for the task's UOW. This data is still held on the System Log however, and needs to be deleted by a call to the Log Manager, which CICS issues periodically as part of activity keypoint processing. At the time of an activity keypoint, the CICS Log Manager trims the tail of the System Log by determining the position, called the 'trim point' or 'history point', of the oldest log data still required for any UOW of interest to CICS, and deleting System Log data created before this point.

The log management policy includes at least one log threshold and a plurality of possible actions associated therewith. Preferably, the plurality of possible actions comprises a series of progressively stronger actions for enabling the size of the log to be reduced. The log management policy may also define a series of log thresholds, each having one or more actions associated therewith. The log thresholds may, for example, include user-defined thresholds for available/unavailable log space, a percentage of log space available/unavailable, a number of successive keypoints at which trimming of the log has been inhibited, or the estimated time until the log is full at the current rate of growth, etc. The log policy manager 39 continually monitors the current usage of the transaction log and compares this usage with the log management policy to determine when a log threshold is reached. For example, the log policy manager may maintain a count of the number of successive keypoints at which trimming of the log has been unsuccessful.

The profile 40 identifies the log resource usage characteristics of tasks associated with certain types of transactions. Preferably the profile identifies, for each type of transaction, task or UOW, a range of acceptable values for a plurality of log resource usage characteristics. Such characteristics may include time taken for a task to complete, CPU resource consumed, number of log records made, etc. The profile thus indicates the normal logging behaviour of particular types of UOW. For example a certain type of UOW may normally persist for a long period of time (and perhaps thereby temporarily prevent log data deletion) before completing, whereas another type of UOW may normally complete within a short time period. From a comparison of the 'normal' profile behaviour of different types of transactions with the current log resource usage of individual UOWs, the likelihood that a particular active UOW, which has been inflight for a long period of time and is now preventing the log from being trimmed, has entered an invalid loop and represents a 'bad' program, rather than simply validly taking a long time to complete can be inferred.

The profile is typically provided by a system programmer on set up of the system, perhaps within a configuration file. In CICS, the profile may be provided as attributes of CICS Transaction resource definitions. Different types of transaction or task can be identified by a Transaction ID, or Transaction code, for example.

Figure 4:
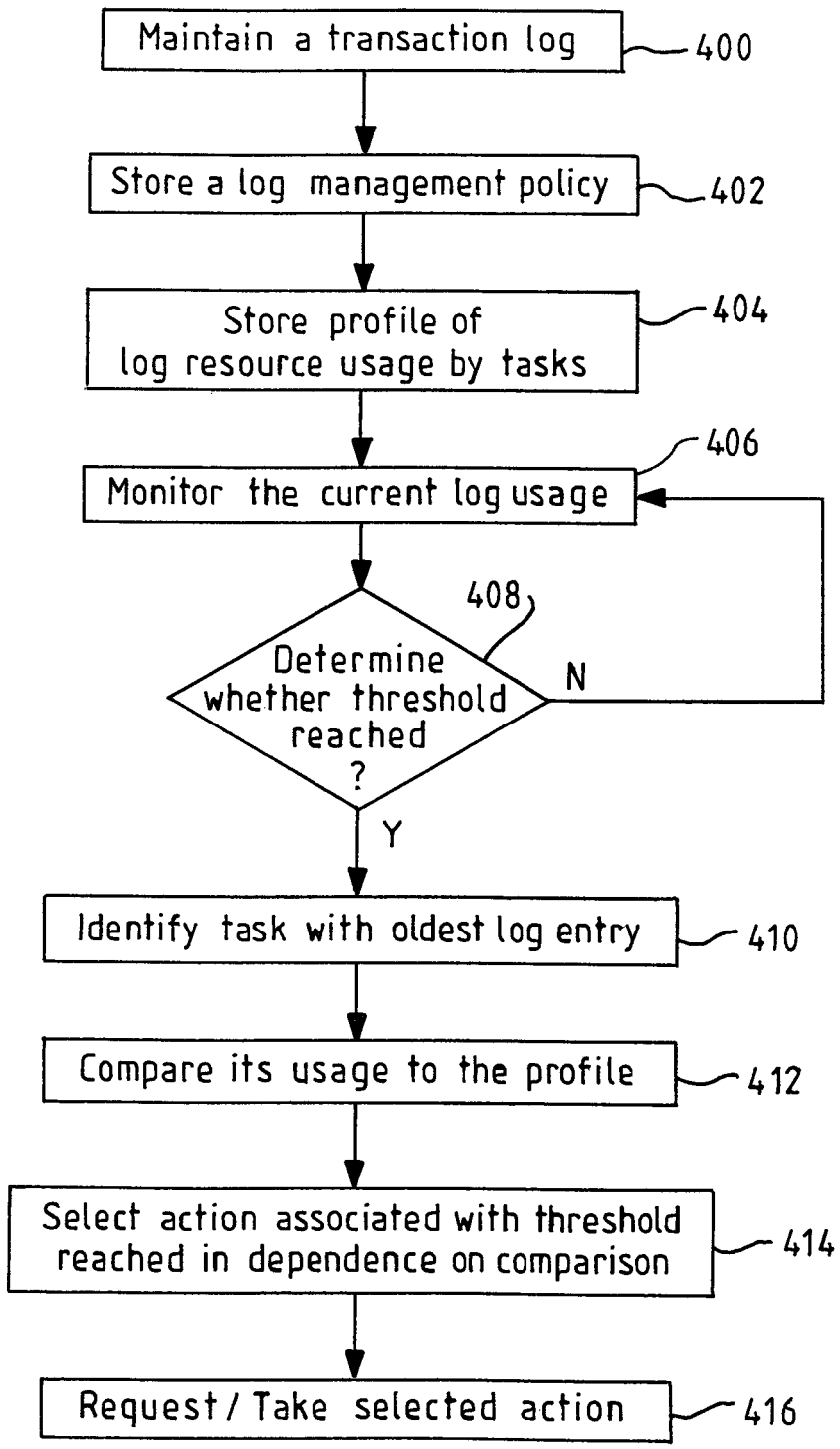
FIG. 4 shows a flowchart of a method according to an embodiment of the invention.

A method for managing a transaction log in accordance with the preferred embodiment will now be described with reference to FIG. 4. The method comprises maintaining 400 a transaction log of recoverable changes made by transaction processing tasks, each task having an associated type; storing 402 a log management policy including at least one log threshold and a plurality of possible actions associated therewith; and storing 404 a profile of log resource usage characteristics of tasks for different types of transactions. Then usage of the log by transaction processing tasks is monitored 406 to determine 408 when a log threshold is reached. If it is determined that a log threshold has been reached, then the active task having the oldest log entry of all active tasks is identified 410; the log resource usage of the identified task is compared 412 to the log resource usage characteristics included in the profile for the type of the identified task. In dependence on the results of this comparison, one of the plurality of possible actions associated with the threshold reached is selected 414 and requested/taken 416.

A series of progressively stronger actions may for example comprise: emitting a warning message; dynamically altering the running of the UOWs within the system, such as by increasing a dispatching priority of a rogue task; and, finally, removing the identified task from the system. Within CICS there are a series of three progressively stronger mechanisms for actively removing a task from the system: purging a task, force-purging a task; and killing a task. These last two options can remove a task from the system with increasing speed and urgency, but the cost is a possible loss of data integrity, and a possible loss of both data and system integrity, respectively.

Preferably, the log manager selects a stronger action if the comparison step indicates that the current log usage of the identified task is outside the characteristic profile for its associated type of transaction, which indicates the task is more likely to be in an invalid loop, than if the log usage of the task is within its normal bounds.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc. and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method, within a transaction processing system executing a two-phase commit protocol, for managing a transaction log of a plurality of recoverable changes made by transaction processing tasks, each recoverable change corresponding to a unit of work performed by a particular transaction processing task having an associated transaction type, comprising:
   monitoring usage of the transaction log by the transaction processing tasks;
   comparing a measure of log space within the transaction log with a threshold;
   upon a determination that the threshold has been met,
      identifying, from all active tasks, an active task having an oldest log entry within the transaction log;
      identifying a transaction type of the identified active task having the oldest log entry;
      identifying actual log resource usage of the identified active task having the oldest log entry;
      comparing the actual log resource usage with a typical log resource usage for the identified transaction type; and
      selecting, based upon the comparison between the actual log resource usage and the typical log resource usage, one of a plurality of log size reduction actions.

2. The method of claim 1, wherein
the plurality of log size reduction actions are associated with a single threshold.

3. The method of claim 2, wherein
the plurality of log size reduction actions associated with the single threshold are a series of progressively stronger actions to reduce a size of the transaction log.

4. The method of claim 3, wherein
a stronger action is selected upon the actual log resource usage being outside a characteristic profile for the identified transaction type.

5. The method of claim 1, wherein
the threshold is stored within a log management policy, and
the log management policy stores a plurality of log thresholds each having a plurality of log size reduction actions associated therewith.

6. The method of claim 1, wherein
the threshold is met upon,
trimming of the transaction log being inhibited at a predetermined number of successive keypoints, or
an estimate of the time left until the transaction log is full is less than a predetermined period of time.

7. A transaction processing system configured to execute a two-phase commit protocol and manage a transaction log of a plurality of recoverable changes made by transaction processing tasks, each recoverable change corresponding to a unit of work performed by a particular transaction processing task having an associated transaction type, comprising:
at least one hardware processor, wherein the at least one hardware processor is configured to initiate and/or perform:
monitoring usage of the transaction log by the transaction processing tasks;
comparing a measure of log space within the transaction log with a threshold;
upon a determination that the threshold has been met,
identifying, from all active tasks, an active task having an oldest log entry within the transaction log;
identifying a transaction type of the identified active task having the oldest log entry;
identifying actual log resource usage of the identified active task having the oldest log entry;
comparing the actual log resource usage with a typical log resource usage for the identified transaction type; and
selecting, based upon the comparison between the actual log resource usage and the typical log resource usage, one of a plurality of log size reduction actions.

8. The system of claim 7, wherein
the plurality of log size reduction actions are associated with a single threshold.

9. The system of claim 8, wherein
the plurality of log size reduction actions associated with the single threshold are a series of progressively stronger actions to reduce a size of the transaction log.

10. The system of claim 9, wherein
a stronger action is selected upon the actual log resource usage being outside a characteristic profile for the identified transaction type.

11. The system of claim 7, wherein
the threshold is stored within a log management policy, and
the log management policy stores a plurality of log thresholds each having a plurality of log size reduction actions associated therewith.

12. The system of claim 7, wherein
the threshold is met upon,
trimming of the transaction log being inhibited at a predetermined number of successive keypoints, or
an estimate of the time left until the transaction log is full is less than a predetermined period of time.

13. A computer program product, comprising:
a computer readable storage device having stored therein computer program code for executing a two-phase commit protocol and managing a transaction log of a plurality of recoverable changes made by transaction processing tasks, each recoverable change corresponding to a unit of work performed by a particular transaction processing task having an associated transaction type, comprising:
the computer program code, when executed by a transaction processing system, causes the transaction processing system to perform:
monitoring usage of the transaction log by the transaction processing tasks;
comparing a measure of log space within the transaction log with a threshold;
upon a determination that the threshold has been met,
identifying, from all active tasks, an active task having an oldest log entry within the transaction log;
identifying a transaction type of the identified active task having the oldest log entry;
identifying actual log resource usage of the identified active task having the oldest log entry;
comparing the actual log resource usage with a typical log resource usage for the identified transaction type; and
selecting, based upon the comparison between the actual log resource usage and the typical log resource usage, one of a plurality of log size reduction actions.

14. The computer program product of claim 13, wherein
the plurality of log size reduction actions are associated with a single threshold.

15. The computer program product of claim 14, wherein
the plurality of log size reduction actions associated with the single threshold are a series of progressively stronger actions to reduce a size of the transaction log.

16. The computer program product of claim 15, wherein
a stronger action is selected upon the actual log resource usage being outside a characteristic profile for the identified transaction type.

17. The computer program product of claim 13, wherein
the threshold is stored within a log management policy, and
the log management policy stores a plurality of log thresholds each having a plurality of log size reduction actions associated therewith.

18. The computer program product of claim 13, wherein
the threshold is met upon,
trimming of the transaction log being inhibited at a predetermined number of successive keypoints, or
an estimate of the time left until the transaction log is full is less than a predetermined period of time.

* * * * *